July 23, 1946.  L. MARICK  2,404,736
ELECTRICALLY HEATED COVER
Filed Sept. 2, 1942   2 Sheets-Sheet 1
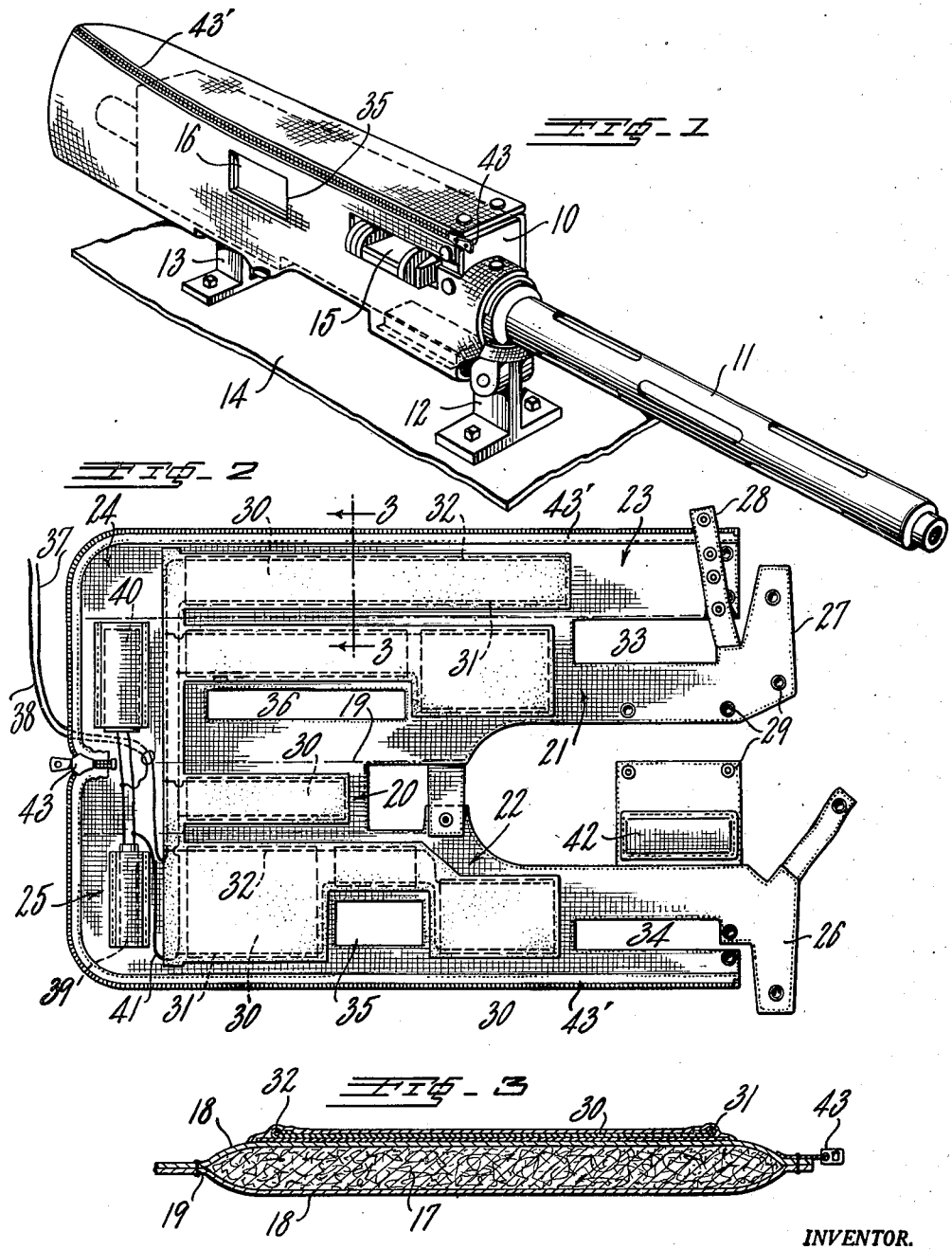
INVENTOR.
LOUIS MARICK
BY Lester G. Budlong
ATTORNEY July 23, 1946.  L. MARICK  2,404,736
ELECTRICALLY HEATED COVER
Filed Sept. 2, 1942  2 Sheets-Sheet 2
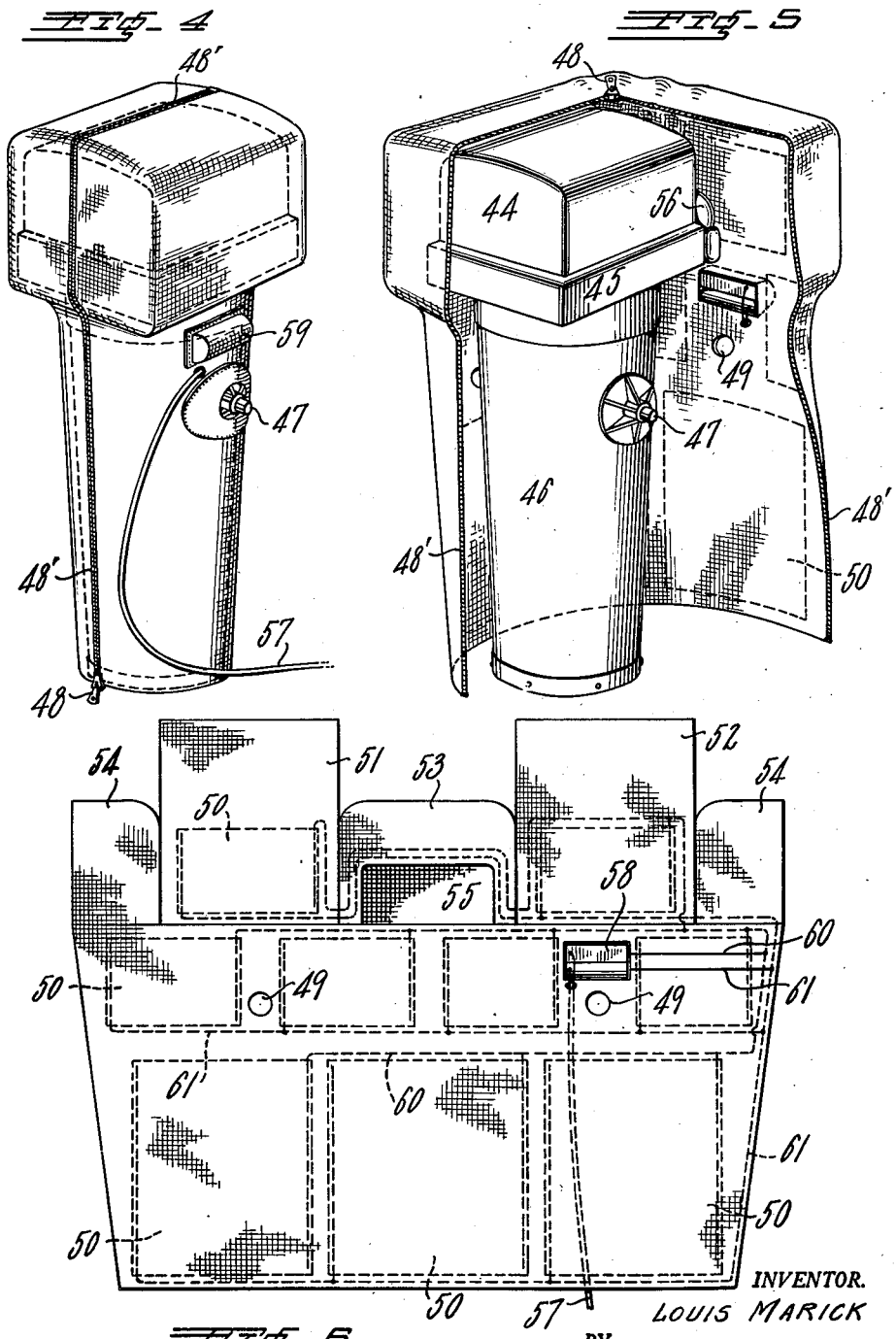
INVENTOR.
LOUIS MARICK
BY
ATTORNEY Patented July 23, 1946

2,404,736

UNITED STATES PATENT OFFICE 2,404,736

ELECTRICALLY HEATED COVER

Louis Marick, Grosse Pointe Farms, Mich., assignor to United States Rubber Company, New York, N. Y., a corporation of New Jersey Application September 2, 1942, Serial No. 457,021

1 Claim. (Cl. 219—19)

This invention relates to electrically heated covers for aerial cameras, machine guns and other mechanical devices that do not work well in the extremely cold temperatures of high altitudes.

Difficulty has been experienced heretofore in operating aerial cameras in airplanes flying at high altitudes where the temperature may be as low as —60° F. The reason for this is that most aerial cameras are constructed to operate automatically and are provided with gears and sliding parts that require lubrication. When extremely cold the lubricating oil or grease upon these mechanical parts congeals and this is likely to cause such parts to operate slowly and inaccurately if they operate at all.

Furthermore the rated speed of the unexposed camera film varies with the temperature, the film being more sensitive to light at higher temperatures and has its sensitiveness seriously reduced by extreme cold.

It is also found that aircraft machine guns do not operate properly at high altitudes due to the tendency of the intricate parts to stick or move sluggishly when extremely cold, and to the formation of ice upon the gun parts when moisture condenses thereupon and then freezes. Likewise aircraft instruments, bomb sights and other delicate mechanical devices may be adversely affected by extreme cold.

Having in mind the foregoing, the present invention contemplates electrically heated covers or jackets formed of connected fabricated sections shaped to fit about the casing of the camera, gun or other mechanical device to be heated, and having attached to the sections electrical heating units adapted to be supplied with electric energy from the aircraft generator, batteries or other source of electrical current to keep the enclosed device warm.

The cover is preferably formed of relatively thick heat insulating material, such for example as pads of felt having a protecting sheet of duck fabric secured to each face thereof, to protect the enclosed mechanical device from the cold and confine the heat supplied thereto.

The cover is constructed to conform closely to the contour of the device upon which it is to be used and to this end is formed with sections shaped to fit the different faces of the casing to be heated, and these sections are preferably connected by hinge-like lines of fold so that they may be folded snugly about the casing. Slide fasteners or other securing means are provided for removably securing the cover about the casing.

Each cover section, or as many of the sections as it is desired to heat, may have secured to the inner face thereof one or more electrical heating units of the desired area. These heating units are preferably formed from a sheet of fabric having a sufficient amount of electro-conductive rubber secured thereto to render the fabric a conductor of the proper resistance to form a heating element when a different electrical potential is maintained across the sheet. The arrangement is such that each heating element has a large hot surface in contact with a metal surface of the gun to effectively heat the gun, or in contact with the other casing to be heated.

Operating current is preferably supplied to this electro-conductive sheet by securing spaced parallel conductive wires lengthwise of the sheet. When a heating unit of this type is employed it is unnecessary to use heating wires in the fabric cover where they might be injured by the flexing of the cover, and are otherwise objectionable.

The various features of the present invention will be more fully understood from the following description when read in connection with the accompanying drawings illustrating two good practical embodiments of the present invention.

In the drawings:

Fig. 1 is a perspective view of a machine gun of a type adapted to be mounted in the wings of an airplane, and having the electrically heated cover of the present invention secured about the gun casing.

Fig. 2 is an inside view of the cover of Fig. 1 shown spread out.

Fig. 3 is an enlarged sectional view taken on the line 3—3 of Fig. 2.

Fig. 4 is a perspective view of an aerial camera that is completely enclosed in an electrically heated cover constructed in accordance with the present invention.

Fig. 5 is a similar view showing the cover partly removed so as to disclose the aerial camera; and Fig. 6 is an inside view of the cover of Fig. 5 shown spread out, but with the seams in the upper portion of the cover not finished and the slide fastener elements not applied.

It is contemplated that electrically heated covers constructed in accordance with the present invention may be employed upon various mechanical devices that are housed in a casing of definite contour so that the cover may be shaped to conform accurately thereto. The present cover however has been developed primarily for use upon aerial cameras and gun casings, in connection with which it will now be described.

The machine gun of Fig. 1 in itself forms no part of the present invention and may be of well known construction. As shown it comprises the machine gun casing 10 and barrel 11. These guns usually are not adjusted while the airplane is in flight but are rigidly mounted in the airplane wings so that they may be aimed at the target by directing the airplane itself at the target. The gun is therefore shown as having the supporting brackets 12 and 13 which are rigidly secured to the wing structure 14. The gun casing 10 is provided near its forward end with the slotted opening 15 adapted to receive the belt which supplies the cartridges to the machine gun. Near the rear end of the gun casing 10 there is provided the rectangular opening 16 for an electric solenoid unit that operates the gun.

A machine gun is a relatively intricate piece of mechanism having numerous cooperating parts that need to be lubricated, and when the gun is exposed to the extremely cold temperature to which an airplane is subjected when it is flying several miles above the earth, it may operate improperly when the lubricant is congealed by the cold or fail to operate at all.

The present invention seeks to avoid this difficulty by providing the gun casing with a thick, snugly fitting cover of heat-insulating material which is adapted to protect the operating parts of the gun from extreme cold, and also to supply sufficient electrical heat thereto to maintain the gun operating parts at the desired temperature.

The electrically heated cover of the present invention can be variously constructed and is preferably so made that it can be readily applied to the gun casing and removed therefrom, it being desirable to remove the casing when the gun is to be serviced before the airplane takes off, but the cover remains upon the gun while it is in operation and throughout the airplane flight. The cover is therefor provided with such openings as may be needed to clear the electric cables leading thereto and to permit ammunition to be supplied to the gun.

In the construction shown the gun cover is formed primarily of a relatively thick sheet of insulating material 17 such as sheet felt sandwiched between two woven sheets of fabric 18 such as duck. The cover is preferably constructed so as to form thick sections having the contour of the various walls of the gun casing to be covered, and these sections are connected by fabric seams 19 formed by sewing the sheets 18 together at spaced intervals to provide hinge-like lines of fold so that the padded cover may be folded snugly about the machine gun casing.

The cover shown in Figs. 1 and 2 comprises a bottom section 20 which fits the bottom or underneath wall of the machine gun casing, two side sections 21 and 22, and a top section 23 that engages the top wall of the gun casing. The cover is further provided with the end sections 24 and 25 adapted to enclose the rear end of the gun. It is also provided with the straps 26, 27, and 28 near is forward end having the snap fastener 29 for securing the cover snugly about the forward end of the gun casing and enlarged portion of the gun barrel. The bottom section 20 of the cover is cut away to a substantial degree as shown to clear the supporting brackets 12 and 13.

Each of the sections 20 to 23 inclusive is preferably formed throughout of the two sheets of duck 18 having sandwiched therebetween the thick padding 17, and each of these sections has secured to its inner face the heating element which will now be described. These heating elements extend over a substantial area of each section and have the construction best shown in Fig. 3. Each heating element is preferably formed of a sheet of woven fabric 30 such for example as cotton sheeting having adhesively secured thereto or deposited thereupon a film of electro-conductive rubber to render the fabric sheet an electric conductor of sufficient resistance to produce the desired heating action. The operating current is conveniently supplied to this conductive sheet by folding the longitudinal side edges of the sheet around the conductor wires 31 and 32 so that these wires extend longitudinally of the fabric in direct contact with the longitudinal side edges, whereby when these two wires are maintained at a different electrical potential, current will flow across the conductive sheet 30 from one wire to the other to generate heat uniformly throughout the entire conductive sheet. These heating elements may be made as long and as wide as desired but are preferably rectangular in shape so that the conductor wires 31 and 32 will extend parallel to each other throughout the length of the heating element. It will be noted that some of the heating elements shown in Fig. 2 are wider than others, but this condition is taken care of by increasing or decreasing the electric resistance of a particular fabric sheet by varying the conductive properties of the conductive rubber applied thereto.

It will be noted that the cover shown in Figs. 1 and 2 is provided with the openings 33 and 34 near its forward end. This is to clear the cartridge belt, not shown, but which enters the opening 15 above mentioned. The cover also has the opening 35 to clear the solenoid in the opening 16 above mentioned, and it has a fourth opening 36 shown only in Fig. 2. The heating elements 30, it will be noted from Fig. 2, are so arranged that they clear the openings 35 and 36 and extend over a large area of each of the cover sections 20 to 23. The conductive sheet or heating element 30 is preferably sandwiched between two sheets of non-conducting rubber to thereby house the conductive sheet 30 between two protecting non-conductor sheets. The entire heating element thus formed is preferably vulcanized to or adhesively secured to the inner fabric sheet 18 of the cover as shown in Fig. 3.

Operating current may be supplied to the various heating sheets 30 by the conductor wires 37 and 38 leading from the airplane batteries or other source of electric energy, and the electrically heated cover is preferably provided with a thermostat 39 adapted to turn on the current when the temperature drops below a selected point and to turn off the current when the temperature rises above this point. The cover is also provided with a condenser 40 to reduce sparking when the thermostat operates. It will be noted that one of the conductor wires such as 37 is connected to one wire 32, of each heating unit 30 whereas the other conductor wire 38 is connected to the thermostat and condenser just mentioned, and is then connected by the conductor 41 to the remaining wire 31 of each heating element 30.

The forward end of the cover has a pad 42 of increased thickness adapted to engage the lower face of the gun casing to improve the fit of the cover. The cover is shown as provided with the slide fastener 43 and slide fastener elements 43' extending upwardly along the rear end of the cover and then forward over the top wall of the gun casing as will be apparent from Fig. 1.

One example of a good practical electrically conductive cement which may be used to coat the fabric of the heating element 30 is the following:

| | Parts by weight |
|---|---|
| Rubber | 100 |
| Conducting carbon black | 85 |
| ZnO | 15 |
| Antioxidant | .75 |
| Accelerator | 2.00 |
| Deodorant | .10 |
| Softener | 7.00 |
| Vulcanizing agent | .75 |
| Gasoline | 1500 |

It will be seen from the foregoing that an electrically heated cover such as shown in Figs. 1 and 2 provides a simple and practical means for maintaining a machine gun at a desired temperature even when the airplane in which it is mounted is flying at a high altitude where the temperature is extremely cold.

Another important use of an electrically heated cover such as contemplated by the present invention is to maintain aerial cameras at the desired temperature when they are operated at high altitudes. These cameras are usually constructed to operate automatically to take successive pictures, and it is found that the extreme cold to which they are subjected when the airplane carrying the camera is flying at high altitude seriously interferes with the proper operation of the mechanical part and also reduces the sensitiveness of the unexposed film as above mentioned.

There is shown in Figs. 4 and 5 of the drawings one type of aerial camera which has been used heretofore and which is adapted to operate automatically to take pictures. This camera may be briefly described as having the magazine section 44, body 45 and cone section 46. The cone section 46 is provided with the opposite extending trunnion 47 adapted to support the camera so that it may be manually pointed towards the object to be photographed while the airplane is in flight, or the camera may be set so that it points in the desired direction with respect to the airplane before the latter leaves the ground. In this latter case its setting need not be changed while the airplane is in flight. The camera is provided at its lower end with a large lens not shown and through which the camera may scan the earth below through an opening in the lower wall of the airplane.

This camera as will be apparent from Figs. 4 and 5 is provided with a cover that is constructed to fit neatly over the entire camera casing and is held in snug engagement therewith by the slide fastener 48 which cooperates with the slide fastener elements 48' that extend along the top of the magazine casing 44 and then vertically downwardly along the magazine casing, body and cone to the lower end of the camera as shown. The cover is provided with the openings 49 through which the trunnions 47 extend, and may be provided with such other openings as are needed to permit access to the portions of the camera that need to be operated while the cover is in place.

The cover shown in Figs. 4, 5 and 6 of the drawings preferably has the same construction in cross section as is shown in Fig. 3, and is provided with electrical heating elements such as shown in Fig. 3. The heating elements in the construction of Figs. 4, 5 and 6 are designated by the numeral 50 and as shown in Fig. 6, three of these heating elements are provided in the cone area, four in the body area and two in the top or magazine area. The cover area for the magazine 44 has the back wall 51, front wall 52, right side wall 53 and two half side left walls 54. These walls in the finished cover are united by seams which are only partially formed in the incompleted construction of Fig. 6, and when these seams are formed the upper portion of the cover will have the box-like shape shown in Figs. 4 and 5. The right side wall 53 is provided with the outwardly extending pocket 55 adapted to enclose the camera operating motor 56.

Operating current is supplied to the electrical heating units 50 of the cover by the conductor wires 57 which lead to the thermostat and condenser 58 that fit within the outwardly projecting pocket 59 of the cover. One of the current supply wires for each heating element is connected to the wire 60 and the other is connected to the wire 61 leading to the thermostat or one of the conductor wires 57 as will be apparent from Fig. 6.

It will be seen from the foregoing that an electrically heated cover such as herein disclosed and formed of independently heated sections shaped to fit the different walls of the gun casing, camera or other mechanical device that will not operate properly when very cold, forms a highly practical means of keeping such device warm.

The conductive sheet 30 while above described as preferably formed of a fabric sheet treated with conductive rubber, may be formed of a conductive rubber sheet or conductive plastic sheet alone, and the reference to rubber herein is to be construed broadly as covering natural rubber, synthetic rubber and rubber-like materials.

Having thus described my invention, what I claim and desire to protect by Letters Patent is:

An electrically heated cover constructed to enclose a machine gun having an outer casing formed with walls disposed at an angle to each other, said cover being formed of fabricated flexible sections of a corresponding size to the respective walls of said casing and connected by hinge-like lines of fold of reduced thickness and also having side openings providing access to the casing, electrically operated non-metallic heating units secured to the inner face of said sections and disposed so as to clear said openings and having conductor wires leading thereto, and means for fastening the cover in folded relation about the casing.

LOUIS MARICK.